United States Patent [19]

Mathyssek et al.

[11] Patent Number: 4,622,055
[45] Date of Patent: Nov. 11, 1986

[54] METHOD FOR PRODUCING A BARE FIBER TAPER AT A METALLIZED FIBER

[75] Inventors: Konrad Mathyssek, Zorneding; Jan Smola, Munich, both of Fed. Rep. of Germany

[73] Assignee: Siemens Aktiengesellschaft, Berlin and Munich, Fed. Rep. of Germany

[21] Appl. No.: 746,516

[22] Filed: Jun. 19, 1985

[30] Foreign Application Priority Data

Jun. 20, 1984 [DE] Fed. Rep. of Germany ....... 3422893

[51] Int. Cl.$^4$ ........................................... C03B 37/027
[52] U.S. Cl. ........................................ 65/2; 65/3.31; 65/3.3; 65/4.21; 65/10.2
[58] Field of Search ...................... 65/2, 10.2, 13, 105, 65/112, 3.11, 3.31, 3.3, 37, 4.21

[56] References Cited

U.S. PATENT DOCUMENTS

| 4,067,937 | 1/1978 | Unno et al. ........................... 65/37 X |
| 4,143,940 | 3/1979 | Khoe ...................................... 65/37 X |
| 4,243,399 | 1/1981 | Khoe et al. ........................... 65/37 X |
| 4,336,047 | 6/1982 | Puvlopoulos et al. ............... 65/3.31 |
| 4,407,561 | 10/1983 | Wysocki ............................. 65/3.3 X |
| 4,410,567 | 10/1983 | France et al. ......................... 65/3.3 |

FOREIGN PATENT DOCUMENTS 3034873 3/1982 Fed. Rep. of Germany .
53-144348 12/1978 Japan .
56-25703 3/1981 Japan .................... 65/10.2
56-57017 5/1981 Japan .
58-91403 5/1983 Japan .................... 65/10.2

OTHER PUBLICATIONS

Kuwahara et al., "Efficient Coupling for Semi-Conductor Lasers into Single-Mode Fibers with Tapered Hemispherical Ends", Applied Optics, vol. 19, No. 15, 1 Aug. 1980, pp. 2578-2583.

Primary Examiner—Robert Lindsay
Attorney, Agent, or Firm—Hill, Van Santen, Steadman & Simpson

[57] ABSTRACT

A method for producing a bare fiber taper at a metallized fiber is disclosed and comprises the steps of softening and drawing in an arc of the fiber metallized by sputtering or vapor deposition. The softened metallized fiber thereby constricts and the metallized fiber becomes free of the metallization and, thus, bare over its entire circumference in the arising constriction as a consequence of the influence of the arc. The bare constriction produced in such fashion is parted and a tapering, bare end section thereby arising at one of the two metallized fiber halves produced by the parting can be employed as the bare fiber taper. A fiber taper with lens can be produced by fusing a lens to the bare end section.

16 Claims, 4 Drawing Figures

METHOD FOR PRODUCING A BARE FIBER TAPER AT A METALLIZED FIBER

BACKGROUND OF THE INVENTION

1. Field of the Invention

The present invention relates to a method for producing a bare fiber taper, particularly with a fused lens, on a metallized fiber.

2. Description of the Prior Art

For the construction of transmission modules with a connecting fiber in the form of a monomode fiber, the necessary coupling optics can be realized by a drawn fiber taper with fused lens. Soldering is preferably employed at the present time in the fiber fixing. Metallized fibers from which the coupling optics are to be produced are required for this purpose. The metallization, however, should not cover the region of the taper itself but should likewise only be removed in its immediate area.

A bare, i.e., non-metallized fiber is presently used as a starting point. After manufacture of the taper on the bare fiber, for instance, as disclosed in our copending application, Ser. No. 642,583, this is completely metallized together with the adjacent, bare fiber. The removal of the metallization in the region of the taper can be executed by soldering or, respectively, de-alloying or involved photochemical processes can be carried out.

SUMMARY OF THE INVENTION

An object of the present invention is to provide a method wherein additional steps or procedures for the removal of the metallization are not necessary.

This object is achieved by a method of softening and drawing a metallized fiber in an arc whereby the softened, metallized fiber constricts and the metallized fiber is freed of metallization. The metallized fiber thus becomes bare over its entire circumference in the arising constriction as a consequence of the action of the arc. After the metallized fiber is parted at this constriction, the bare constriction thus arising and a tapering, bare end section thereby arising on the metallized fiber are employable as a bare fiber taper. In the method of the invention, the removal of the metallization in the region of the taper occurs simultaneously with the manufacture of the taper itself.

The local removal of the metallization of the fiber is based on the fact that the ignition of the arc is accompanied by flame-like ignition and subtilization of the metal layer on the fiber. The metal layer will subtilize completely in a longitudinally axial region of the fiber such that metal is no longer situated on the fiber in this region but the optical quality of the fiber in this region, is not deteriorated. A fiber metallized by sputtering or vapor-deposition can also be advantageously softened and drawn. The overall layer thickness of the metallization sputtered or deposited onto the fiber should thereby lie on the order of 1 $\mu$m.

Specific fiber metallizations and fibers which are well suited for the method of the invention in practice and which also have favorable properties in other respects, for example with respect to their adhesion to the fiber and their solderability, include a fiber metallized in layers by sputtering and/or vapor-deposition of various metals such as first a titanium layer, a palladium layer and then a gold layer. The metallized fiber is preferably softened in an alternating current arc.

For reasons of the mechanical stability of the taper (microphony effect), the burnoff length, i.e. the distance between the lens or, respectively, the free end of the bare taper and the undamaged, solderable metallization of the fiber should be as small as possible, preferably less than 1 mm. It has been found that the burnoff length depends neither on the discharge current nor on the type of metal layer on the fiber but is dependent only on the distance between the electrodes between which the arc is generated. The burnoff length becomes smaller with a decreasing distance between the electrodes because the three dimensional expanse of the arc decreases with this distance. Accordingly, it is advantageous and practical to execute the method of the invention in accord with a method in which the electrodes between which the arc in which the metallized fiber is softened is produced are disposed at an interval $d_e$ from one another whereby a prescribed, defined burnoff length ($l_o$) of the metallization on the metallized fiber is maximally reached. For producing a prescribed burnoff length $l_o$ of at most 1 mm, the distance $d_e$ of at most 1.65 mm should be observed between the electrodes.

Expediently, the distance between the electrodes is selected at a maximum of 1.3 mm. The burnoff length of 1 mm can be easily observed given this interval.

In a practical implementation of the method of the invention, it has proven useful when the fiber is drawn with a drawing rate that amounts to about 0.04 mm/s. For fusing the lens to the taper, either of two methods can be employed to produce the bare taper with fused lens in one working cycle. The first method contemplates that after the formation of the bare constriction in the metallized fiber, the arc is shut off, the metallized fiber is parted in the bare constriction, and a lens is fused to the free end of the tapering, bare end section. The second method contemplates that after the formation of the bare constriction, the tractive force acting on the fiber is removed, but the bare constriction is left in the arc until the metallized fiber parts itself in the bare constriction and a lens has formed on the free end. Such a method for parting bare fibers is disclosed in our earlier patent application, Ser. No. 642,583, assigned to the assignee of the present application in conjunction with the manufacture of a taper with lens at a bare fiber. In the first method mentioned above, the partition in the constriction is preferably undertaken by bending the metallized fiber until fracture in the bare constriction occurs.

BRIEF DESCRIPTION OF THE DRAWINGS

An illustrative embodiment of the invention shall be explained in greater detail in the following description with reference to the figures.

FIG. 1a is an enlarged side view of the fiber constriction produced by the apparatus of FIG. 1

FIG. 2 is a further magnified side view of the constriction shown in FIG. 1a.

DESCRIPTION OF THE PREFERRED EMBODIMENTS

Figure 1:
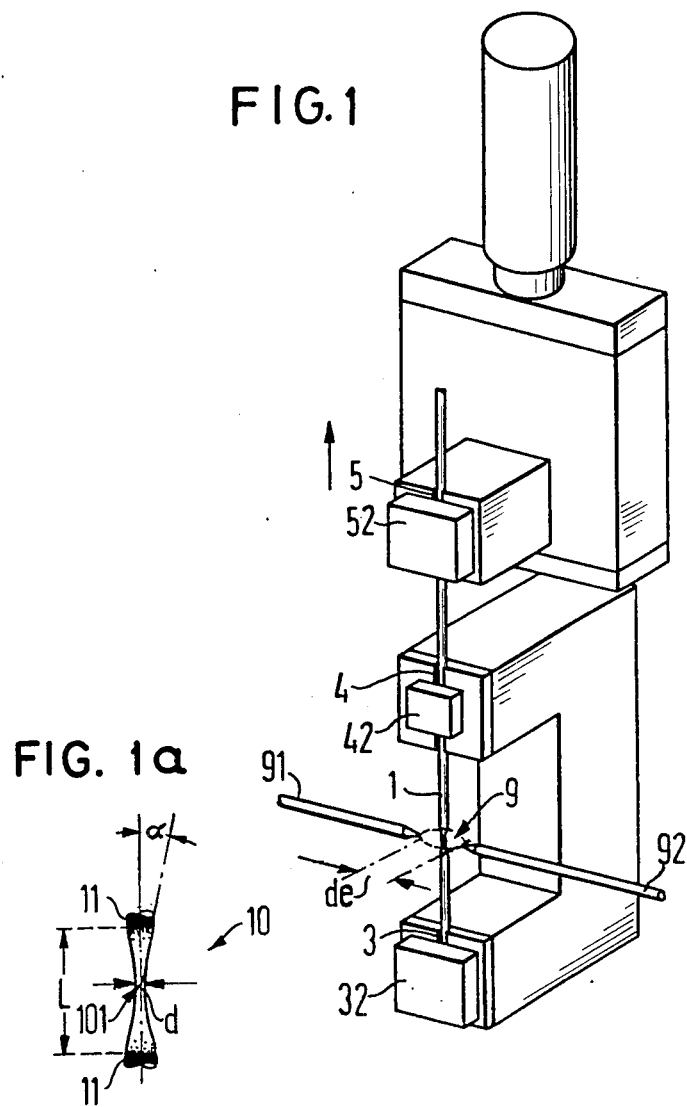
FIG. 1 is a perspective view of drawing apparatus for producing taper fibers as disclosed in our earlier patent application now Pat. No. 4565558, granted 1/21/86 and which is also advantageously used for the method disclosed herein.

The apparatus of FIG. 1 is essentially composed of two electrodes 91 and 92 disposed at an interval $d_e$ from one another and of three aligning guide grooves 3, 4 and 5 into which a metallized fiber 1, for example a metallized monomode and fiber, is inserted and fixed, for example with magnets 32, 42 and 52. The forces of the magnet 32 on the lower groove 3 and the magnet 52 on the upper groove 5 are selected such that the fastening of the fiber 1 in the upper groove 5 acts like a friction clutch during drawing. When a traction motor (not shown) is switched on which moves the upper groove 5 and the two other grooves 4 and 3 fixed relative to one another, apart in a longitudinally axial direction of the grooves, the force of the magnet 52 is too low to retain the fiber 1 in clamping fashion and the inserted fiber 1 slips through.

The center groove 4, which must align very precisely with the lower groove 3, serves only for guidance. A weak magnet 42 on this groove 4 having low power in comparison to the magnets 32 and 52 serves only to hold the fiber 1 in the groove 4.

Figure 2:
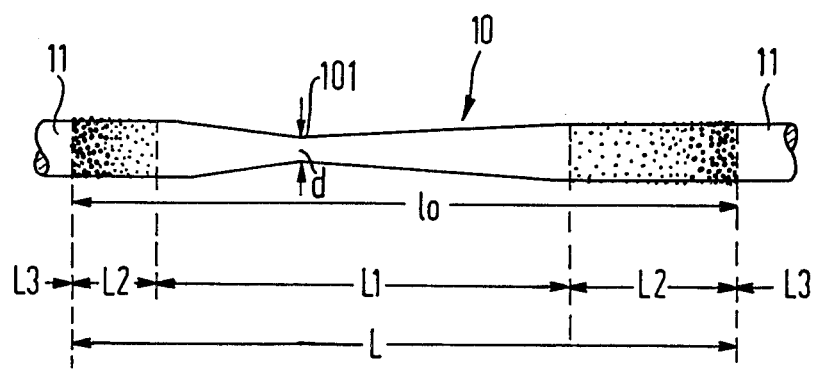
Figure 3:
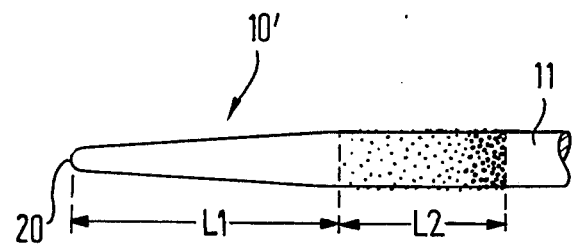
FIG. 3 is a bare taper with lens produced from the constriction of FIG. 2.

When an AC arc 9 is switch on, this forming between the electrodes 91 and 92, the fiber 1 situated therein is very quickly locally heated to the softening point of the fiber material. The force of the uppermost magnet 52 then suffices in order to re-clamp the fiber 1 in the groove 5 and the formation of a bare constriction 10 in the softened section of the fiber 1 occurs in the AC arc 9, as shown magnified in FIG. 1 and illustrated in greater detail in FIG. 2.

A maximum angle of slope $\alpha$ of the bare constriction 10 being formed in the AC arc 9 and a diameter d of a waist 101 thereof can be set by selecting a few operating parameters. Such parameters include: the discharge current and the on time of the arc 9, the interval or distance $d_e$ between the electrodes 91 and 92, and the drawing rate with which the softened fiber is pulled apart or, with which the upper groove 5 and the grooves 4 and 3 fixed relative to one another, are moved apart. Tests have shown that the maximum angle of slope $\alpha$ of the bare constriction 10 can be influenced only by changing the interval $d_e$ between the electrodes 91 and 92. This result applies both to the bare constriction 10 in metallized fibers 1 as well as to constrictions in non-metallized fibers. The maximum angle of slope $\alpha$ of the constriction is influenced by the width of the melting zone in the arc 9 which is varied by adjusting the interval $d_e$ between the electrodes 91 and 92. The diameter d of the waist 101 of the constriction depends on the burning time of the arc 9 and on the drawing rate. These qualitative dependencies apply when drawing both bare constrictions 10 in metallized fibers 1 as well as constrictions in non-metallized fibers.

Some particular characteristics occur, however, when producing bare constrictions in metallized fibers. When the fiber 1 placed into the V-grooves 3-5 is a metallized fiber, for example a monomode fiber of silica glass on whose smoothly burnished surface a 30–100 nm thick titanium layer has first been applied, then a 250–450 nm thick palladium layer, by sputtering, and, subsequently, a 100–500 nm thick gold layer has been applied by vapor deposition, then a flame-like ignition and subtilization of the layer-like metallization 11 of the fiber 1 is thereby damaged and becomes unsolderable within a specific region L in the longitudinally axial direction of the fiber 1. Three regions L1 through L3 to be distinguished are formed, these being indicated in FIG. 2. Practically no metal remains on the fiber 1 after the drawing operation in the region L1 in which the constriction has formed. The original metallization 11 has been subtilized by the burning arc. Although the surface of the bare fiber 1 in the region L1 may exhibit poorer quality in comparison to the surface of a taper drawn from a non-metallized fiber, no additional optical losses are thereby induced.

The metallization in the region L2 proximate to the region L1 on both sides is melted over a certain length and, among other things, numerous spherules may form, these being easy to remove mechanically. The removal of these spherules composed of a metal alloy in the exemplary, metallized monomode fiber 1 can occur by itself in a following immersion soldering of the metallized fiber 1.

The region L2 is followed by the region L3 in which the solderable metallization 11 which is multi-layered in the exemplary monomode fiber, applied to the metallized fiber 1 is undamaged.

Due to the good thermal conductivity of the metallization 11, a larger diameter d of the waist 101 of the bare constriction 10 results under constant operating parameters upon using metallized fibers 1 than given constrictions of non-metallized fibers. In order to obtain the same diameter d of the waist 101 given the same drawing rate and same discharge current of the arc 9, the drawing time must be lengthened given the metallized fiber 1 in comparison to the non-metallized fiber.

For reasons of the mechanical stability of the coupling arrangement (microphony effect), a defined burnoff length $l_0$ should be as small as possible, at most 1 mm. The defined burnoff length $l_0$ corresponds to the length of a region L, i.e. to the spacing between the undamaged metal layers 11 at both sides of the bare constriction 10.

The burnoff length $l_0$ depends neither on the discharge current nor on the type of metal layer and can only be influenced by the interval $d_e$ between the electrodes 91 and 92. With a decreasing interval $d_e$, the region L in which the metal layer of the fiber 1 is melted becomes smaller because the three-dimensional expanse of the arc 9 decreases with the interval $d_e$ between the electrodes 91 and 92.

Given an interval $d_e = 1.65$ mm, a burnoff length $l_0$ which fluctuates around 1 mm is obtained. The fluctuations in the burnoff length $l_0$ are relatively small, for example about 50 $\mu$m, and may possibly be caused by irregularities in the metal layer on the fiber 1. Given an interval $d_e$ of at most 1.3 mm, burnoff lengths $l_0$ that are consistently less than or equal to 1 mm are obtained.

The partition of the constriction given non-metallized fibers can ensue with a fiber cutting device with diamond cutter set to the desired range of the diameter of the waist of the constriction. The constriction can thereby be cut with a precision of $\pm 20$ $\mu$m at the desired location. It has now been determined that a parting of bare constrictions 10 in metallized fibers is not possible with the same precision as non-metallized fibers with a cutting device of this same type. The bare constriction 10 tends to break off in the waist 101 under the bending stress before emplacement of the diamond cutter since the stiffness of the metallized fiber 1 is greater than that of the non-metallized fiber. Greater bending of the fiber in the bare waist 101 therefore leads to a premature break at this location.

When breaking, smooth cleavage faces of good quality result which do not have any particular irregularities at the edge such as, for example, chips. Thus, a lens can be fused directly to the smooth face.

For parting the bare constriction 10 in the metallized fiber 1, a second method can be utilized. In such method, after formation of this constriction 10, the tractive force acting on the fiber 1 is removed, but the bare constriction 10 is left in the arc 9 until the fiber 1 parts by itself in the bare constriction 10 and a lens 20 has formed at the free end of a tapering, bare end section 10' thereby arising. This bare end section 10 is then employed as a bare fiber taper. This type of parting is more precise than the parting by fracture and has the advantage that the bare fiber taper with fused lens can be produced in one working cycle.

It has turned out that, given the same interval $d_e$ between the electrodes 91 and 91 and given the same drawing rate, the same maximum angle of slope $\alpha$ derives regardless of whether the fiber employed is metallized or non-metallized. Given an interval $d_e = 1.3$ mm between the electrodes 91, 92 and a drawing rate of 0.04 mm/s, the maximum angle of slope amounts to $\alpha \pm 15^0 \pm 1^0$.

Measurements of the coupling efficiency at bare fiber tapers that have been produced from metallized and from non-metallized fibers have shown that no differences in coupling efficiency derive within the range of measuring precision given the same radius of curvature of the lens at the taper.

The multi-layer metallization of the 30–100 nm titanium layer, the 250–450 nm thick palladium layer and the 100–500 nm thick gold layer on the monomode fiber specified above by way of example has proven favorable with respect to its adhesion on the fiber and its solderability.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. A method for producing a bare fiber taper at a metallized, fiber, comprising the steps of;

softening and drawing of a metallized glass optical fiber in an arc, whereby the softened, metallized fiber constricts and the metallized fiber is freed of the metallization and thus becomes bare over its entire circumference in the arising constriction as a consequence of the action of the arc, whereby, after parting, the bare constriction thus arising and a tapering, bare end section thereby arising at a metallized fiber is employable as a bare fiber taper.

2. A method according to claim 1, wherein said fiber is first metallized by sputtering or vapor deposition and later is softened and drawn.

3. A method according to claim 2 wherein the layer thickness of the metallization sputtered or vapor deposited onto the fiber lies on the order of 1 $\mu$m overall.

4. A method according to claim 1, wherein said fiber is first metallized in layers by sputtering and/or vapor deposition of various metals.

5. A method according to claim 4, wherein said fiber is metallized first with a titanium layer, then with a palladium layer and then with a gold layer.

6. A method according to claim 5, wherein said titanium and palladium layers are applied by sputtering and said gold layer is applied to the fiber by vapor deposition.

7. A method according to claim 5, wherein said titanium layer is sputtered to a thickness of about 30–100 nm, said palladium layer is sputtered to a thickness of about 250–450 nm and said gold layer is deposited to a thickness of about 100–500 nm.

8. A method according to claim 1, wherein said metallized fibers first has the metallization applied to a polished surface of a bare fiber.

9. A method according to claim 1, wherein the metallized fiber is softened in an alternating electrical arc.

10. A method according to claim 10, wherein electrodes between which said arc is produced are first spaced at an interval from one another to provide a prescribed, defined burnoff length of the metallization on the metallized fiber before the fiber is introduced to the arc.

11. A method according to claim 11, wherein a prescribed, defined burnoff length of at most about 1 mm is desired, a defined interval between the electrodes is set.

12. A method according to claim 12, wherein an interval of at most 1.3 mm is first set between the electrodes.

13. A method according to claim 10, wherein the metallized fiber is pulled with a drawing rate of about 0.04 mm/s during the softening by the arc.

14. A method according to claim 10, wherein after the formation of the bare constriction in the metallized fiber, the arc is shut off, the metallized fiber is parted in the bare constriction, and a lens is fused to the free end of a tapering, bare end section thereby arising which is thereafter employed as bare fiber taper.

15. A method according to claim 15, wherein the parting is undertaken by bending the metallized fiber until fracture in the bare constriction.

16. A method according to claim 10, wherein after the formation of the bare constriction in the metallized fiber, the tractive force acting on the fiber is removed, but the bare constriction continues to be left in the arc until the metallized fiber parts by itself in the bare constriction and a lens has formed at the free end of a tapering, bare end section thereby arising which is thereafter employed as a fiber taper.

* * * * *